United States Patent Office 3,249,505
Patented May 3, 1966

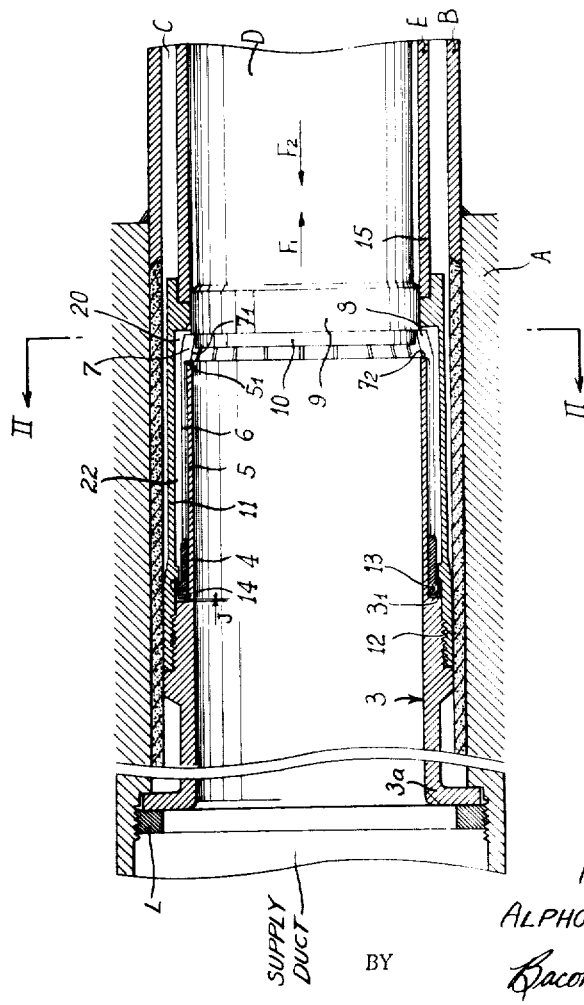
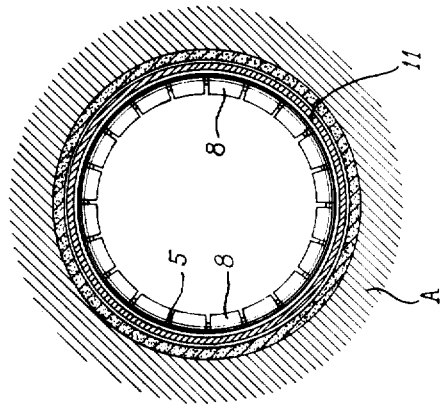

3,249,505
RETAINING MEANS FOR NUCLEAR FUEL CORES AT THE END OF A REACTOR DUCT
Noël Laurent, Saint-Mande, and Alphonse Peuchmaur, Boulogne-sur-Seine, France, assignors to Commissariat à l'Energie Atomique, Paris, France
Filed May 29, 1962, Ser. No. 198,586
Claims priority, application France, June 6, 1961, 864,000
1 Claim. (Cl. 176—43)

The invention relates to a means for retaining nuclear fuel cores at one end of a reactor duct, that is to say, in practice at the entrance to the duct from the side where the loading of the cores is carried out.

It is known to provide a resilient latching means at the entrance to the ducts of a nuclear reactor for preventing the rearward movement of the cores which are introduced, despite forces (particularly of weight and/or thrust of the heat-transfer fluid) which may be exerted in this direction. Such a latching means can be formed by bolts urged resiliently towards the axis of the duct; but such an arrangement has the disadvantage of being cumbersome and of requiring a large volume of material absorbing the neutrons. A better arrangement consists in the use of pawls or dogs carried by the duct, formed by resilient fingers working in compression or tension in order to transmit the thrust of the cores. However, this arrangement also requires relatively robust members for transmitting the forces to which they are subjected without any excessive constraint.

The invention has for its object the design of a simplified end retaining means which is lighter in weight and can easily be removed.

The arrangement according to the invention for retaining nuclear fuel cores at the end of a reactor duct comprises a series of pawls formed by detents carried by resilient elements urging the detents towards the axis of the duct, into a position in which they project into the passage section of the cores, and is characterised in that each detent comprises in addition a rearward projection which is adapted to bear on a fixed stop element under the pressure of the cores.

The invention also consists of other means which can advantageously be used at the same time as the foregoing, and to which more detailed reference will be made below.

The invention will be best understood from reading the following description, which relates to the accompanying drawing showing one embodiment which is given simply by way of example. In the drawing:

FIGURES 1 and 2 are respectively an axial section and a transverse section along the line II—II of FIGURE 1, showing a force tube for a nuclear reactor provided with a core-retaining means according to the invention.

FIGURE 1 shows a reactor force tube B, into which the cores D are introduced through a supply duct and a tubular guide assembly 3 rigidly connected to the inner wall of said duct by a lock ring L. Means according to the invention ensure the retaining of the cores, that is to say, counteracts the rearward movement of the last core introduced in a direction opposite to the direction of insertion, once this core has moved past the said means.

FIGURES 1 and 2 show an arrangement according to the invention, mounted in the chamber A of a pressure tube reactor B, designed to resist the pressure difference between the chamber and the duct C which they define; the cores such as D introduced into the duct are centered therein by a guide tube E separated from the pressure tube by a heat insulation means (not shown). The guide tube E, which forms the inner end portion of the tubular guide assembly 3 is connected to the outer end member 3a of said assembly by a tubular element 11 suitably connected at one end to the guide tube E and threadably attached at the other end thereof to the end member 3a as at 12. The terminal inner end 5 of the outer end member 3a is coaxial with and spaced radially inwardly from the tubular element 11 forming therewith an elongated, annular chamber 22. The terminal end 5 extends to a point adjacent to but spaced from the connection between the tubular element 11 and the guide tube E, providing therewith passage means 20 connecting the chamber 22 and the interior of the guide assembly 3. The end $5_1$ of the terminal end 5 forms one wall of said passage means and provides a radially extending abutment surface means facing in said predetermined direction. The cores are introduced successively into the guide tube E in the direction indicated by the arrow $F_1$. The retaining means must resist either the weight of the cores (reactor having vertical ducts loaded from the bottom end), or the thrust exerted on the train of cores by the heat-transfer fluid circulating in the direction of the arrow $F_2$, or the two forces simultaneously (vertical ducts and descending circulation of heat-transfer gas).

The retaining means shown in FIGURES 1 and 2 comprises pawls or dogs formed on the free ends of resilient tongues carried by a sleeve mounted in the annular chamber 22.

This sleeve, which is of any suitable material having appropriate mechanical and possibly neutronic characteristics, comprises a base member 4 and tongues 6, provided for example, by slotting an initial sleeve which is an extension of the base member 4. The tongues 6 terminate in bent portions 7 which are intended to act as detents; the base member 4 obviously has an internal diameter enabling it to slide on the terminal portion 5 of the end member 3a.

At rest, the tongues 6 are adapted to bear resiliently against the terminal portion 5. In this position, the end projection 8 of the detents 7 projects slightly radially inwardly beyond the internal surface of the tubular guide assembly 3.

The detents 7 have an internal face forming an inclined ramp $7_1$, which encounters each core D when it is introduced. The front end of the introduced core pushes back the detent devices, which remain in their deformed position until the entire core has passed by and then they resiliently resume the locking position, in which they constitute a stop for the rear end of the core. The core D and the retaining means are shown in FIGURE 1 in the position which they occupy when the core is abutting against the detent devices.

Each detent device comprises a rear projection $7_2$ adapted to bear, under the pressure of the cores, on the end face $5_1$ of the extension 5 of the member 3a, an arrangement which helps to relieve the tongues 6 from the weight of the cores. In order that the bearing of the projections $7_2$ on the end face $5_1$ may be effective, it is necessary to provide a certain axial oscillation of the base member 4 in its connecting means with the member 3a and the tubular element 11, as will hereinafter be seen.

Preferably, each core comprises a rear cap 10 of a diameter slightly smaller than that of the portion 9: the presence of this cap fixes the point of engagement of the detent on the core D and avoids the dangers of exaggerated flexing of the detents due to excessive radically inward sliding on the rear face of the core.

The fixing of the latching means 4, 6, 7, 8 is preferably ensured by the external tubular element 11 covering the latching means.

This element 11 may be provided with a projection 13, the abutment of which against a shoulder 14 of the base member 4 limits the forward displacement of the base member and the tongues 6. In order that the transfer of the thrust of the cores to the duct is effected directly by the detents without intervention of the tongues and the base, a clearance J is provided between the bottom of the base and the facing shoulder $3_1$ of the duct.

Between the extension 5 and an extension 15 provided for completing the guiding of the cores towards their operative position inside the pressure tube, there is provided an annular opening 20 providing a passage for the detents 7.

The operation of the arrangement will be apparent from reading the foregoing. However, it is necessary to note the numerous advantages which it has by comparison with already existing assemblies, particularly, the following: the size of the device is small and the mounting thereof is easy; compression stresses on the resilient portions of the device are avoided, since the tongues 6 are relieved by the abutment of the rear projections $7_2$ on the end face $5_1$; as regards dimensions, it will be possible to note that an arrangement has been constructed which is mounted in a duct with a diameter of 85 mm. and designed for a normal force of approximately 400 kg. at 500° C. and capable of supporting a thrust of 1000 kg. without danger of breaking.

As will be obvious and as will moreover already be apparent from the foregoing, the invention is not limited only to those of its embodiments or to those of its constructional forms and various parts which have been more especially considered, but on the other hand covers all modifications.

What we claim is:

In a pressure tube nuclear reactor having a supply duct with a longitudinal axis, a retaining device disposed in said duct and located adjacent one end thereof for preventing movement of nuclear fuel elements in a predetermined direction along said axis after they have been inserted into the entrance of said duct and past said device in a direction opposite to said predetermined direction, said device comprising: a tubular guide assembly disposed coaxially within said duct for receiving and guiding fuel elements therein; means rigidly connecting said tubular guide assembly to the inner wall of said duct; the wall of said tubular guide assembly being formed adjacent the entrance end thereof with a closed, elongated, annular chamber disposed coaxial with said tubular guide assembly and spacing the inner wall of said guide assembly from the outer wall thereof; said inner wall of said guide assembly being formed with passage means extending therethrough connecting the end of said chamber remote from said entrance with the interior of said guide assembly; said passage means providing radially extending abutment surface means on the said inner wall facing said predetermined direction and detent means carried by said guide assembly and lying in the path of said nuclear fuel elements and engageable therewith, said detent means including an annular base member slidably mounted in said annular chamber adjacent the end thereof opposite said passage means for limited axial movement therein, a plurality of equally spaced, elongated resilient tongues, rigid at one end thereof with said base member and extending substantially parallel with the axis of said guide assembly from said base member to said passage means, and detents rigid with the other end of said tongues and extending radially inwardly through said passage means and into the interior of said guide assembly for engaging the nuclear fuel elements inserted therein, said detents being movable in said passage means and being biased radially inwardly by said resilient tongues, said detents having radially extending end surfaces facing toward and away from said entrance, the end surfaces facing in the direction of said entrance of said guide assembly and extending through said passage means providing stop surfaces for abutment with the opposed surface means of said inner wall when said detent means is moved in a direction toward said entrance, the end surfaces facing away from said entrance and extending into the interior of said guide assembly providing abutments for engaging the rear end portion of a fuel element, axial movement of said tongues and of said base member being unrestrained in an axial direction when said stop surfaces of said detents are abutted against said opposed surface means of said inner wall, and stop means carried by said guide assembly and engageable with said base member permitting limited axial movement of said detent means in a direction away from the entrance of said guide assembly for spacing said stop surfaces of said detents a limited distance from the opposed surface means of said inner wall.

References Cited by the Examiner

UNITED STATES PATENTS

| 2,727,761 | 12/1955 | Elliott et al. | 285—322 X |
| 3,011,406 | 12/1961 | Werle et al. | 89—1.7 |
| 3,020,887 | 2/1962 | Hobson et al. | 121—40 |
| 3,071,529 | 1/1963 | Davies | 221—81 |

REUBEN EPSTEIN, *Primary Examiner.*

P. G. BETHERS, *Assistant Examiner.*